US006545461B1

United States Patent
Miyata

(10) Patent No.: US 6,545,461 B1
(45) Date of Patent: Apr. 8, 2003

(54) ELECTRO MAGNETIC INDUCTION POSITION DETECTOR USING METAL FOIL TO REDUCE TEMPERATURE-BASED VARIATIONS IN POSITION DETECTION

(75) Inventor: Toshiharu Miyata, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 47 days.

(21) Appl. No.: 09/803,055

(22) Filed: Mar. 12, 2001

(30) Foreign Application Priority Data

Mar. 13, 2000 (JP) ........................................ 2000-068413

(51) Int. Cl.$^7$ .............................. G01B 7/14; G01B 7/02; G01D 5/20
(52) U.S. Cl. ............................. 324/207.17; 324/207.24; 340/870.32; 336/45
(58) Field of Search ...................... 324/207.12, 207.15, 324/207.16, 207.17, 207.24, 207.26, 225, 260, 261, 262; 336/45; 340/870.32, 870.33; 341/15

(56) References Cited

U.S. PATENT DOCUMENTS

| | | | | |
|---|---|---|---|---|
| 5,050,703 A | * | 9/1991 | Graff et al. ................. 181/106 |
| 5,801,530 A | * | 9/1998 | Crosby et al. ................. 174/36 |
| 5,901,458 A | | 5/1999 | Andermo et al. ...... 324/207.17 |
| 6,096,482 A | * | 8/2000 | Omote et al. ................ 430/311 |
| 6,100,582 A | * | 8/2000 | Omote et al. ................ 257/699 |
| 6,245,432 B1 | * | 6/2001 | Funada et al. ........... 427/388.1 |

* cited by examiner

Primary Examiner—Jay Patidar
(74) Attorney, Agent, or Firm—Oliff & Berridge PLC

(57) ABSTRACT

An electromagnetic induction position detector has a detection head and a scale which are placed so as to be opposed to each other with a predetermined gap in a relatively movable manner. The detection head has a driving coil which generates a primary varying magnetic flux, and a receiving coil which detects a magnetic pattern changed in a predetermined spatial period and in a direction of the relative movement. The scale 2 has a magnetic modulating section which modulates the primary varying magnetic flux to generate the magnetic pattern. The scale 2 has a plate-shaped resin substrate 30. Metal foil 61 of a predetermined pattern which prevents the resin substrate 30 from being expanded or contracted, and suppresses an eddy current formed on a face of the scale opposite to a face on which the magnetic modulating section is formed.

11 Claims, 3 Drawing Sheets

ELECTRO MAGNETIC INDUCTION POSITION DETECTOR USING METAL FOIL TO REDUCE TEMPERATURE-BASED VARIATIONS IN POSITION DETECTION

BACKGROUND OF THE INVENTION

1. Field of the Invention

The present invention relates to an electromagnetic induction position detector, which detects a relative position between a detection head and a scale with using electromagnetic coupling between the detection head and the scale, and more particularly to an improvement of such a scale.

2. Description of the Related Art

In related art, an electromagnetic induction position detector, which uses electromagnetic coupling between a detection head and a scale, comprises: a detection head in which a driving coil and a receiving coil are disposed; and a scale in which a magnetic modulating section such as closed loop coils is disposed. The magnetic modulating section is relatively moved with respect to the detection head to modulate a magnetic flux generated by the driving coil. A primary varying magnetic flux which is generated when the driving coil is AC-driven is modulated by the scale, so that a magnetic pattern of a predetermined period is formed. The magnetic pattern is coupled with the receiving coil of the detection head. As a result, an induced voltage which is varied in accordance with movement of the scale appears in the receiving coil. When variations of the induced voltage are detected, it is possible to detect the relative movement distance of the scale with respect to the detection head. Alternatively, a plurality of tracks in which magnetic patterns are formed in different periods may be disposed, induced voltages may be respectively detected by receiving coils of the tracks, and a phase difference between the induced voltages of the tracks may be detected, so that an absolute position detection is enabled.

In the electromagnetic induction position detector, the scale is configured so that magnetic modulating means such as closed loop coils is formed by a metal pattern on a resin substrate. Therefore, the resin substrate may be expanded or contracted, or warped under the influence of the external temperature. Such expansion or contraction, or warpage causes a positional error or a gap variation in the relative movement direction with respect to the detection head, whereby correct position detection can be hardly performed.

SUMMARY OF THE INVENTION

The invention has been conducted in view of these problems. It is an object of the invention to provide an electromagnetic induction position detector in which influence of the external temperature is eliminated to always enable correct position detection.

The electromagnetic induction position detector of the invention comprises a detection head and a scale that are placed to be opposed to each other with a predetermined gap in a relatively movable manner. On a side of the detection head, a driving coil which generates a primary varying magnetic flux, and a receiving coil which detects a magnetic pattern that is changed in a predetermined spatial period and in a direction of the relative movement are disposed. The receiving coil is formed in the predetermined spatial period and in the relative movement direction. On a side of the scale, a magnetic modulating section which modulates the primary varying magnetic flux to generate the magnetic pattern is disposed. The magnetic modulating section is arranged in the predetermined spatial period and in the relative movement direction. In the electromagnetic induction position detector, the scale is made of a plate-shaped resin, the magnetic modulating section is formed on a surface which is opposed to the detection head of the scale, and metal foil of a predetermined pattern is formed on a surface of the scale which is opposite to the opposed face.

According to the invention, the metal foil of a predetermined pattern is formed on the surface of the resin scale that is opposite to the surface on which the magnetic modulating section is formed. Even when the temperature is changed, therefore, the scale can be effectively prevented from being expanded or contracted, or warped. The metal foil is not formed as a so-called solid pattern, but is patterned, and hence also the influence of an eddy current which is generated in the metal foil can be suppressed.

In a preferred embodiment of the invention in which an eddy current can be effectively suppressed, the metal foil is formed by at least one linear pattern which elongates in the relative movement direction. When the metal foil is formed by one of: a pattern in which at least one linear pattern that elongates in the relative movement direction are combined with at least one linear pattern that elongates in a direction perpendicular to the relative movement direction; an X-shaped pattern; a pattern in which at least one linear pattern that elongates in the relative movement direction are combined with an X-shaped pattern; and a lattice-shaped pattern, expansion and contraction in not only the relative movement direction but also a direction perpendicular to the relative movement direction can be suppressed. Alternatively, the metal foil may have an island-shaped pattern. The metal foil may have a pattern substantially symmetric with respect to a centerline along with the relative movement direction of said scale, or has a pattern substantially symmetric with respect to a centerline in the relative movement direction of said scale.

DESCRIPTION OF THE PREFERRED EMBODIMENT

Figure 1:
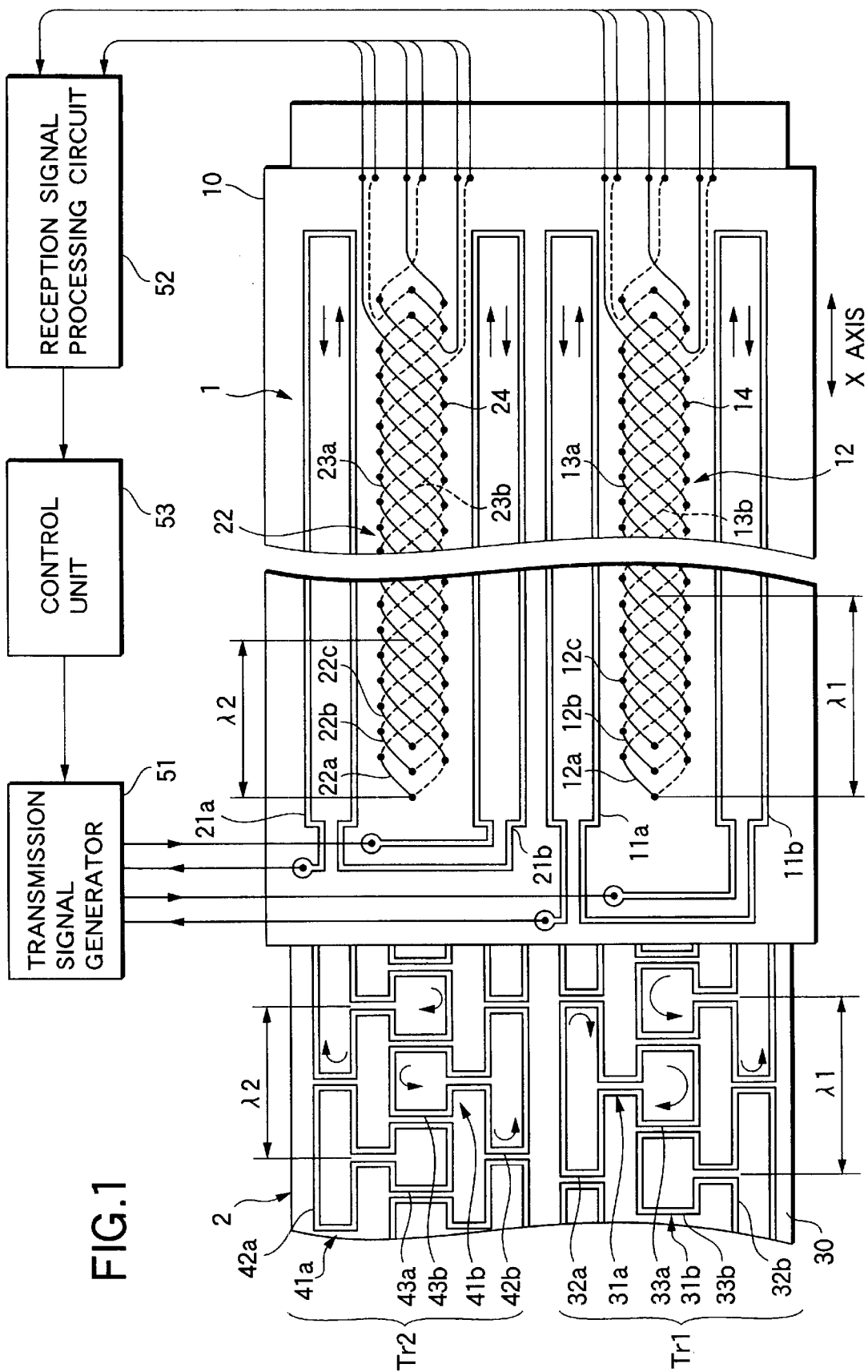
FIG. 1 is a perspective view showing main portions of an electromagnetic induction position detector according to a first embodiment of the invention.

Hereinafter, preferred embodiments of the invention will be described with reference to the accompanying drawings. FIG. 1 is a view showing main portions of an electromagnetic induction position detector according to a first embodiment of the invention.

The detector has a detection head 1 and a scale 2 which are placed so as to be opposed with a predetermined gap and relatively movable in the X-axis direction in the figure. The lower halves of the detection head 1 and the scale 2 in the figure constitute a first track Tr1, and the upper halves constitute a second track Tr2.

In the detection head 1, the portion of the first track Tr1 has a pair of driving coils 11a and 11b which are formed on a head substrate 10, and a receiving coil 12 which is placed between the driving coils 11a and 11b. The driving coils 11a and 11b have a rectangular pattern which elongates in the X-axis direction, and are connected to each other so that currents flow in opposite directions. For example, the current in the driving coil 11a flows in a counterclockwise direction, and that in the driving coil 11b flows in a clockwise direction. In the receiving coil 12, detection loops which are repeated in a period $\lambda 1$ in the X-axis direction of the head substrate 10 are formed by positive and negative sinusoidal patterns of a fundamental period $\lambda 1$. The sinusoidal patterns consist of patterns 13a and 13b formed on both the faces of the head substrate 10, and through wirings 14 connecting the patterns 13a and 13b with each other. In the embodiment, the receiving coil 12 is configured by three-phase receiving coils 12a, 12b, and 12c which are shifted in spatial phase in the X-axis direction. For example, the receiving coils 12a, 12b, and 12c are star-connected.

The second track Tr2 in the detection head 1 is configured in the same manner as the first track Tr1, except that the fundamental period is $\lambda 2$ which is slightly shorter than $\lambda 1$. Driving coils 21a and 21b of the second track Tr2 correspond to the driving coils 11a and 11b of the first track Tr1, receiving coils 22, 22a, 22b, and 22c of the second track Tr2 correspond to the receiving coils 12, 12a, 12b, and 12c of the first track Tr1, and patterns 23a and 23b and through wirings 24 of the second track Tr2 correspond to the patterns 13a and 13b and the through wirings 14 of the first track Tr1, respectively.

On the other hand, the portion of the first track Tr1 in the scale 2 is configured by alternately placing coupling coils 31a and 31b serving as magnetic modulating section, on a plate-shaped resin substrate 30. The coupling coils 31a are closed loop coils which are arranged in the fundamental period $\lambda 1$. Each of the coupling coils 31a has a first loop portion 32a which is to be magnetically coupled with the driving coil 11a of the detection head 1, and a second loop portion 33a which is to be magnetically coupled with the receiving coil 12 of the detection head 1. The coupling coils 31b are configured by closed loop coils which are arranged with being shifted in phase by 180° with respect to the coupling coils 31a. Each of the coupling coils 31b has a first loop portion 32b which is to be magnetically coupled with the driving coil 11b of the detection head 1, and a second loop portion 33b which is to be magnetically coupled with the receiving coil 12 of the detection head 1.

Also the second track Tr2 in the scale 2 is configured in the same manner as the first track Tr1, except that the fundamental period is $\lambda 2$ which is slightly shorter than $\lambda 1$. Coupling coils 41a and 41b of the second track Tr2 correspond to the coupling coils 31a and 31b of the first track Tr1, and first loop 42a and 42b and second loop 43a and 43b of the second track Tr2 correspond to the first loop portions 32a and 32b and the second loop portions 33a and 33b of the first track Tr1, respectively.

A single-phase AC. transmission signal is supplied from a transmission signal generator 51 to the driving coils 11a, 11b, 21a, and 21b of the detection head 1. At certain timing, therefore, a current flows in a counterclockwise direction in the driving coils 11a and 21a, and in a clockwise direction in the driving coils 11b and 21b. As a result, a primary varying magnetic flux which is perpendicularly directed toward this side from the sheet is generated by the driving coils 11a and 21a, and a primary varying magnetic flux which is perpendicularly directed toward the opposite side from the sheet is generated by the driving coils 11b and 21b. The primary varying magnetic flux generated by the driving coils 11a and 21a cross the first loop portions 32a and 42a of the coupling coils 31a and 41a of the scale 2, respectively, so that a current in a clockwise direction is produced in the coupling coils 31a and 41a by electromagnetic induction. This causes a secondary varying magnetic flux which is perpendicularly directed toward the opposite side from the sheet to be generated in the second loop portions 33a and 43a. On the other hand, the primary varying magnetic flux generated by the driving coils 11b and 21b cross the first loop portions 32b and 42b of the coupling coils 31b and 41b of the scale 2, respectively, so that a current in a counterclockwise direction is produced in the coupling coils 31b and 41b by electromagnetic induction. This causes a secondary varying magnetic flux which is perpendicularly directed toward this side from the sheet to be generated in the second loop portions 33b and 43b. Therefore, magnetic patterns of the periods $\lambda 1$ and $\lambda 2$ due to the secondary varying magnetic fluxes, the directions of which are alternately changed, are formed by the second loop portions 33a and 33b, and 43a and 43b. The secondary varying magnetic fluxes forming the magnetic patterns are magnetically coupled with the receiving coils 12 and 22, respectively.

Each of the receiving coils 12 and 22 outputs a three-phase reception signal which is varied in accordance with the relative position with respect to the scale 2. The reception signals are processed by a reception signal processing circuit 52, and phase information of the tracks Tr1 and Tr2 is obtained. A control unit 53 sends a command for transmitting the transmission signal, to the transmission signal generator 51, and calculates the position of the detection head 1 with respect to the scale 2, from the phase information supplied from the reception signal processing circuit 52.

Figure 2:
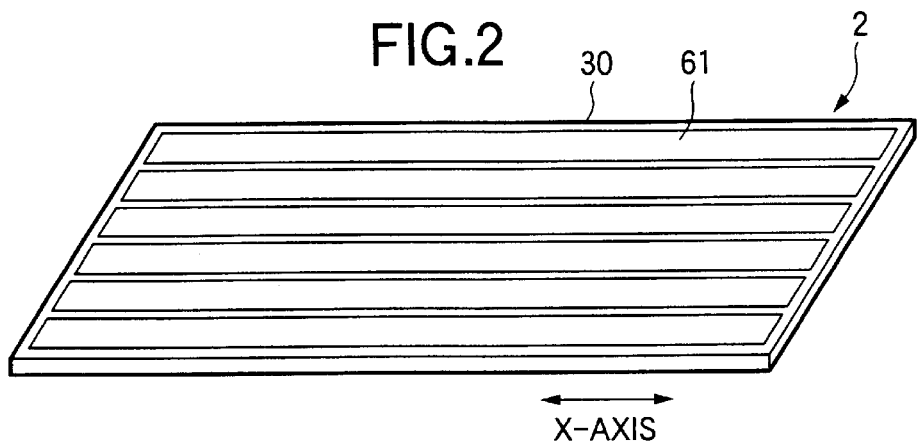
FIG. 2 is a perspective view showing the pattern of metal foil in the first embodiment of the invention which is formed on the rear face of a scale of the detector.

In the thus configured electromagnetic induction position detector, the resin substrate 30 is used in the scale 2, and hence there is a fear that the resin substrate 30 may be expanded or contracted, or warped under the influence of the external temperature. To comply with this, the detector is configured as shown in FIG. 2. Metal foil (for example, copper foil) of a predetermined pattern is formed on a face (rear face) of the resin substrate 30 of the scale 2 that is opposite to the face (front face) on which the coupling coils 31a, 31b, 41a, and 41b are formed. In the embodiment of FIG. 2, the metal foil is configured by a plurality of linear patterns 61 which elongate in the X-axis direction (scale movement direction), and which are in parallel with each other. According to this configuration, an eddy current which is generated in the metal foil by the primary and secondary varying magnetic fluxes is prevented from flowing in a direction perpendicular to the X-axis direction, whereby the influence of the eddy current can be suppressed. With respect to expansion and contraction of the resin substrate 30 in the X-axis direction, the strength is held to be substantially equal to that in the case where the metal foil is configured by a solid pattern. In the linear patterns, the effect of suppressing an eddy current is higher as the patterns are thinner, or as the number of the patterns is smaller.

Figure 3A:
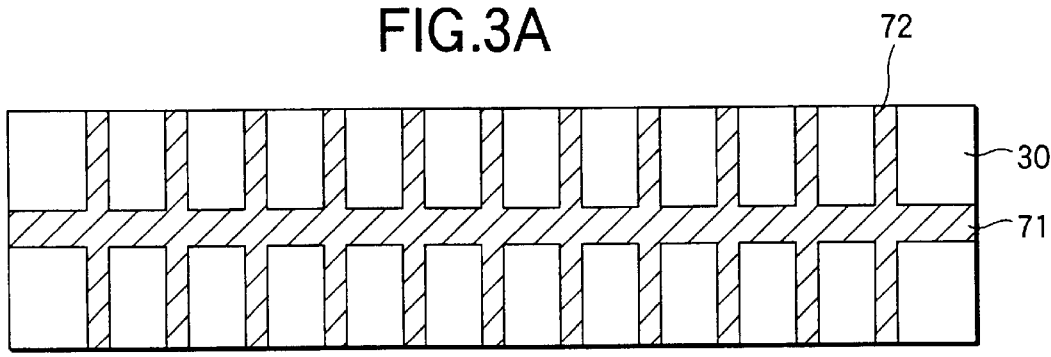
FIGS. 3A–C are respectively plan views showing patterns of metal foil in a second embodiment of the invention.
Figure 3B:
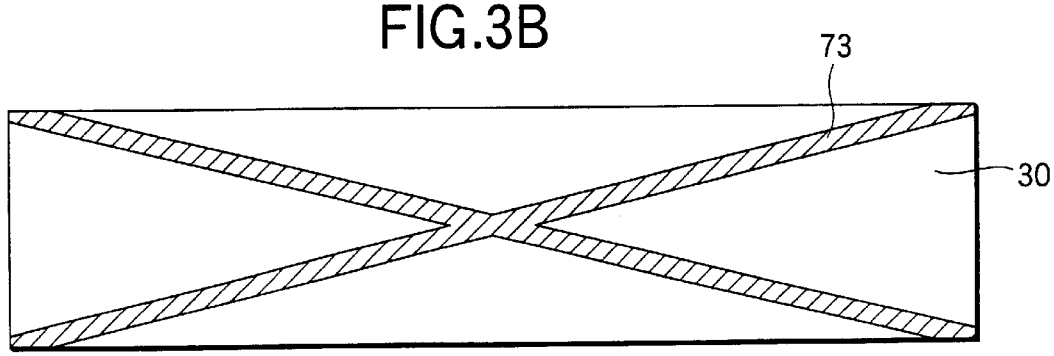
Figure 3C:
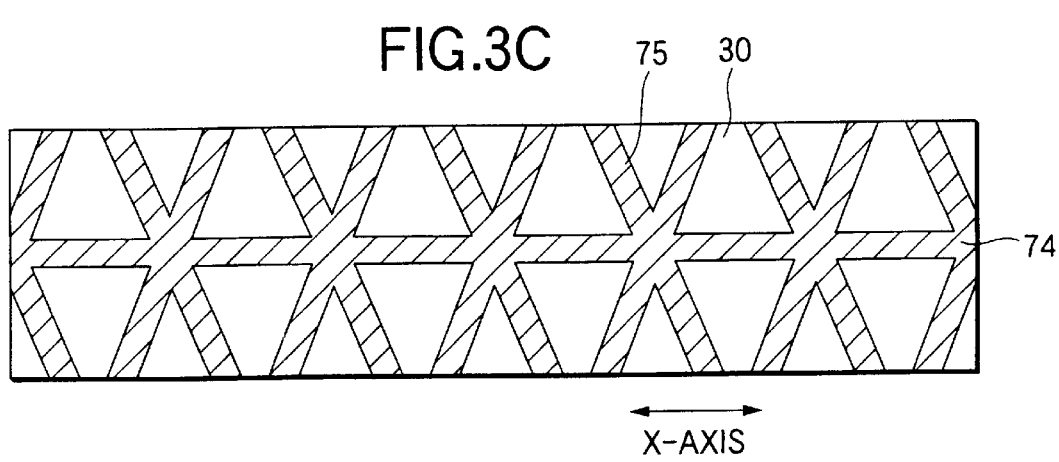

FIGS. 3A–C shows a second embodiment of the invention, and illustrates patterns in which the effect of preventing expansion and contraction can be attained in not only the X-axis direction but also a direction perpendicular to the X-axis direction. In the figure, hatched portions are portions where metal foil is formed.

FIG. 3A shows a pattern in which a linear pattern 71 that elongates in the X-axis direction is combined with linear patterns 72 that are arranged at given intervals along the linear pattern 71 and elongate in a direction perpendicular to the X-axis direction. FIG. 3B shows an X-shaped pattern 73 that elongates in diagonal directions of the resin substrate 30. FIG. 3C shows a pattern in which a linear pattern 74 that elongates in the X-axis direction is combined with X-shaped patterns 75 that are arranged at given intervals along the linear pattern 74.

Figure 4A:
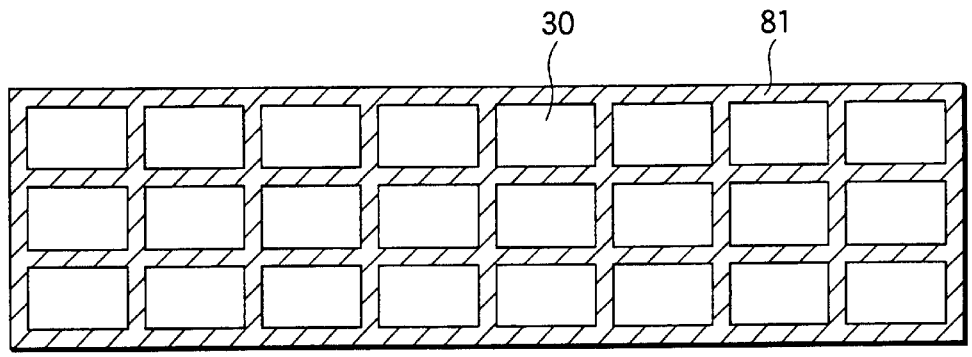
FIGS. 4A–C are respectively plan views showing patterns of metal foil in a third embodiment of the invention.
Figure 4B:
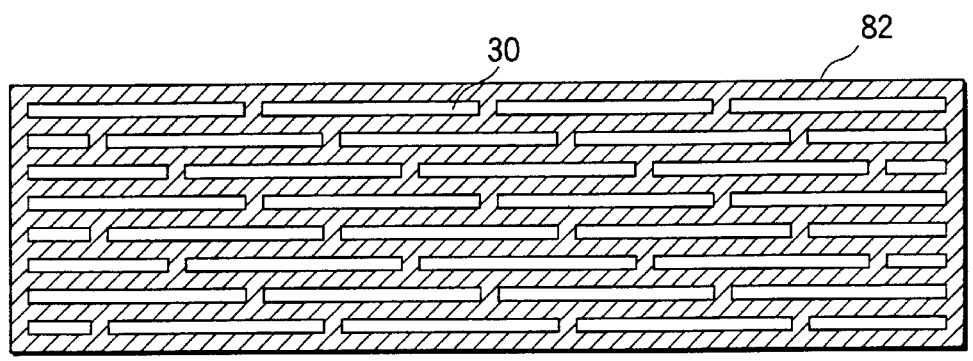
Figure 4C:
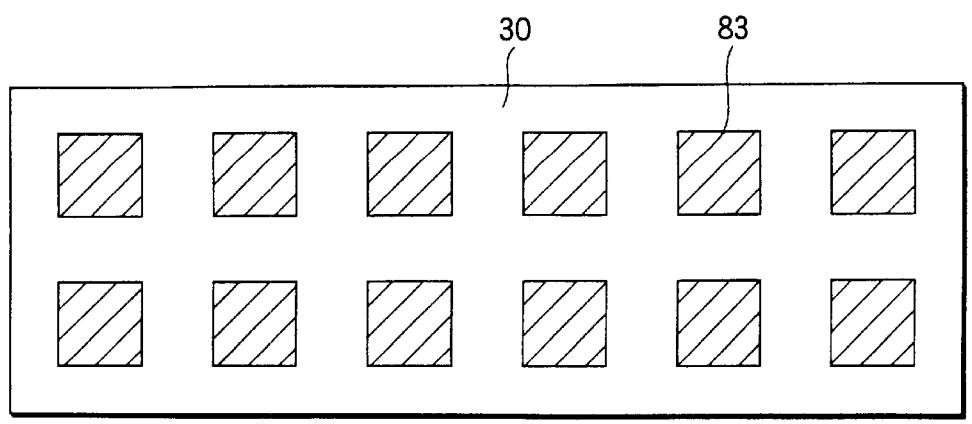

Although the effect of suppressing an eddy current is slightly reduced, other patterns may be used in which the area where metal foil is formed is made larger in order to enhance the effect of reducing expansion and contraction of the resin substrate 30. Such patterns include a lattice-shaped pattern 81 shown in FIG. 4A, and a staggered pattern 82 shown in FIG. 4B. Conversely, although the effect of reducing expansion and contraction of the resin substrate 30 is reduced, an island-shaped pattern 83 shown in FIG. 4C may be formed as a pattern having an excellent effect of suppressing an eddy current.

The metal foil is requested to have a coefficient of linear expansion which is smaller than that of the resin substrate, and may be made of, for example, copper, iron, or an alloy of such metals.

As described above, according to the invention, metal foil of a predetermined pattern is formed on a face of the resin scale opposite to the face on which the magnetic modulating section is formed. Even when the temperature is changed, therefore, the scale can be effectively prevented from being expanded or contracted, or warped. The metal foil is not formed as a so-called solid pattern, but is patterned, and hence it is possible to attain an advantage that also the influence of an eddy current which is generated in the metal foil can be suppressed.

What is claimed is:

1. An electromagnetic induction position detector comprising:

a detection head;

a scale made of a plate-shaped resin and disposed to be opposed to the detection head with a predetermined gap in a relatively movable manner, wherein said head includes a driving coil for generating a primary varying magnetic flux, and a receiving coil for detecting a magnetic pattern that is changed in the predetermined spatial period and in the direction of the relative movement, the receiving coil formed in a predetermined spatial period and in a direction of the relative movement, and said scale includes a magnetic modulating section for modulating the primary varying magnetic flux to generate the magnetic pattern; the magnetic modulating section formed on a first surface opposite to the detection head of the scale and arranged in the predetermined spatial period and in the direction of the relative movement, and a metal foil of a predetermined pattern formed on a second surface opposite to the first surface of the scale, the metal foil having a coefficient of linear expansion less than a coefficient of linear expansion of the resin.

2. The electromagnetic induction position detector according to claim 1, wherein said metal foil includes at least one linear pattern which elongates in the direction of the relative movement.

3. The electromagnetic induction position detector according to claim 2, wherein said metal foil has at least one linear pattern that elongates in a direction perpendicular to the direction of the relative movement.

4. The electromagnetic induction position detector according to claim 1, wherein said metal foil has an X-shaped pattern.

5. The electromagnetic induction position detector according to claim 4, wherein said metal foil has at least linear pattern that elongates in the direction of the relative movement.

6. The electromagnetic induction position detector according to claim 1, wherein said metal foil has a lattice-shaped pattern.

7. The electromagnetic induction position detector according to claim 1, wherein said metal foil has an island-shaped pattern.

8. The electromagnetic induction position detector according to claim 1, wherein said metal foil has a staggered pattern.

9. The electromagnetic induction position detector according to claim 1, wherein the magnetic modulating section includes a string of closed loop coils, which are arranged on said scale in the relative movement direction, for generating a secondary varying magnetic flux that crosses with the primary varying magnetic flux to form the magnetic pattern.

10. The electromagnetic induction position detector according to claim 1, wherein said metal foil has a pattern substantially symmetric with respect to a centerline along with the relative movement direction of said scale.

11. The electromagnetic induction position detector according to claim 1, wherein said metal foil has a pattern substantially symmetric with respect to a centerline in the relative movement direction of said scale.

* * * * *